April 2, 1968 R. F. MAYO 3,376,572

ELECTROACOUSTIC WAVE SHAPING DEVICE

Filed Sept. 15, 1966

INVENTOR.
RALPH F. MAYO
BY
Edward J. Norton
Attorney

United States Patent Office 3,376,572

Patented Apr. 2, 1968

3,376,572

ELECTROACOUSTIC WAVE SHAPING DEVICE

Ralph Frank Mayo, New Brunswick, N.J., assignor to Radio Corporation of America, a corporation of Delaware Filed Sept. 15, 1966, Ser. No. 579,713
8 Claims. (Cl. 343—17.2)

ABSTRACT OF THE DISCLOSURE

A wave shaping device is disclosed which comprises an input pair and an output pair of electrodes each having digital portions arranged in interdigital relationship with each other and deposited on the surface of a piezoelectric substrate. The spacing between adjacent pairs of interdigitized digital portions varies in accordance with an arbitrary code.

Figure 1:
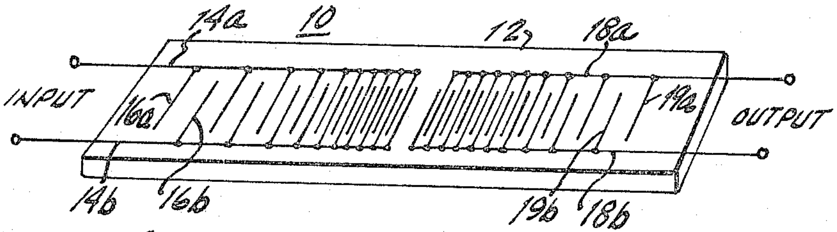

This invention relates to an electroacoustic wave shaping device and, more particularly, to such a device employing acoustic surface waves on a piezoelectric substrate.

In particular, the present invention contemplates use of a piezoelectric substrate on the surface of which is deposited input and output electrode means. Each electrode means is composed of first and second electrodes, each electrode of which has a plurality of digital portions. The digital portions of the first and second electrodes are arranged substantially parallel to each other in spaced interdigital relationship with the spacing distances between each successive adjacent pair of interdigital portions thereof being preselected in accordance with an arbitrary code. The two electrode means are displaced a given distance from each other in a direction substantially perpendicular to the parallel digital portions thereof.

In accordance with the present invention it is proposed that this arbitrary code be chosen to provide desired wave shaping of an applied electrical input signal.

In one case, the spacing distances of the interdigital portions of one electrode means may vary linearly in one direction, while the spacing distances of the interdigital portions of the other electrode means varies linearly in the opposite direction, so that the latter electrode is a mirror image of the former electrode means. If a delta pulse is applied as an input to one of the pair of electrode means, a frequency modulated wave will be obtained as an output from the other of the pair of electrode means. Also, a linear frequency modulated wave may be translated back into a delta pulse by an electroacoustic wave shaping device of the present invention. It has therefore been found that electroacoustic wave shaping devices of the present invention are particularly useful as radar pulse encoders and radar pulse decoders.

If each of the pair of input and output electrode means of the electroacoustic wave shaping device of the present invention are made in a manner such that each of the electrode means directly corresponds to the other, rather than corresponds to a mirror image of the other, the present invention is particularly useful as an extremely wide band filter and/or delay line in the ultra-high frequnecy spectrum or possibly even at higher frequencies.

The electroacoustic wave shaping devices of the present invention may be fabricated with presently available integrated circuit techniques, utilizing a photographic etching process for obtaining the electrode means having desired configurations. With present techniques, it is possible to provide digital portions of only one micron in width, where the minimum spacing between the centers of adjacent digital portions is only three microns. An important advantage of the electroacoustic wave shaping devices of the present invention is that they do not have such sharply defined acoustic resonances as the ordinary flat quartz transducer used to lauch compressional or shear waves. Thus, any "ringing" will be due to electrical circuitry and will be more easily controllable. Thus, greater bandwidths are achievable by means of the present invention.

It is therefore an object of the present invention to provide an improved electroacoustic wave shaping device.

It is a further object of the present invention to provide such a device which is useful as a radar pulse encoder and as a radar pulse decoder.

It is a still further object of the present invention to provide such a device which is useful as a wide band filter and/or delay line.

It is a still further object of the present invention to provide such a device which may be fabricated with integrated circuitry techniques.

Figure 3:
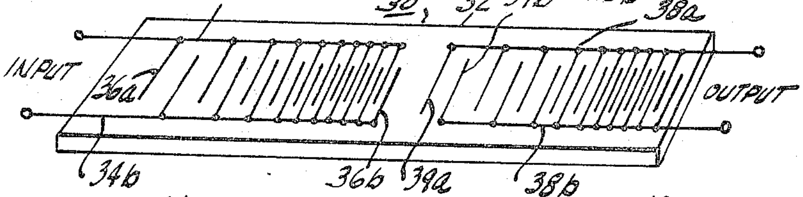
Figure 4:
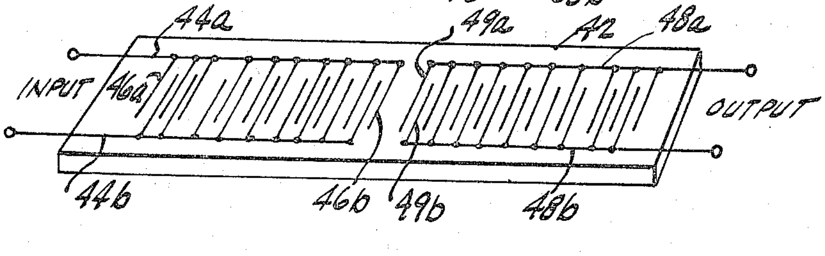
Figure 5:
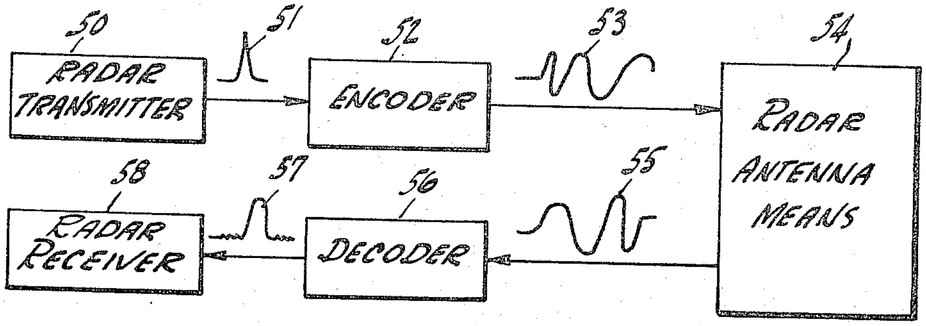

These and further objects, features and advantages of the present invention will become more apparent from the following detailed description taken together with the accompanying drawing in which:

FIGS. 1–4 show, respectively, different embodiments of the present invention; and FIG. 5 shows in block diagram form the manner in which the present invention may be incorporated in a radar system.

Referring to FIG. 1, which shows a first embodiment of the present invention, electroacoustic wave shaping device 10 comprises a piezoelectric substrate 12 on which is deposited input electrode means comprising first electrode **14*a* incorporating digital portions 16*a*, and second electrode 14*b* incorporating digital portions 16*b*. As shown, digital portions 16*a* and 16*b* are arranged in spaced interdigital relationship with respective spacing distances between adjacent pairs of digital portions 16*a* and 16*b* varying linearly from wide to narrow in the direction from left to right. Output electrode means, including first electrode 18*a* having digital portions 19*a* and second electrode 18*b* having digital portions 19*b*, is longitudinally displaced from the input electrode means and is oriented colinear therewith, as shown. Further, the output electrode means is a mirror image of the input electrode means so that the respective spacing distances between adjacent pairs of digital portions 19*a* and 19*b* varies linearly from narrow to wide in a direction from left to right, as shown. Since in practice photo etching is usually used in the process of depositing the input and output electrodes on piezoelectric substrate 12**, the same art work may be used for fabricating the input and output electrode means, respectively, merely by turning over a photographic transparency of the art work to provide a mirror image thereof. In this manner, other than for the fact that the input and output electrode means are mirror images of each other, they may be made completely identical in all respects.

Figure 2:
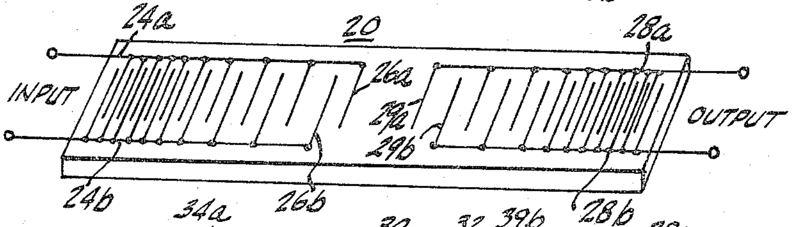

FIG. 2 shows a second embodiment of the present invention which is similar to the first embodiment thereof, except that in the second embodiment of FIG. 2 the respective spacing distances between digital portions **26*a* and 26*b* of the input electrode means thereof varies linearly from narrow to wide in a direction from left to right, while the respective spacing distances of digital portions 29*a* and 29*b*** of the output electrode means of the second embodiment varies linearly from wide to narrow in a direction from left to right. The same art work used in preparing the first embodiment shown in FIG. 1 may be used in preparing the second embodiment shown in FIG. 2, since the output means of the second embodiment shown in FIG. 2 may be made identical to the input means of the first embodiment shown in FIG. 1, while the input means of the second embodiment shown in FIG. 2 may be made identical to the output means of the first embodiment shown in FIG. 1.

The third embodiment of the present invention shown in FIG. 3 is similar to the first and second embodiments in all respects, except that the output electrode means, made up of first electrode 38*a* and 38*b* is an exact replica of the input electrode means made up of first electrode 34*a* and second electrode 34*b*, rather than a mirror image thereof as is the case in the embodiments shown in each of FIGS. 1 and 2.

In the fourth embodiment of the present invention shown in FIG. 4, the output electrode means made up of first electrode 48*a* and 48*b* is a mirror image of the input electrode means thereof made up of first electrode 44*a* and second electrode 44*b*, as is the case in the embodiments shown in each of FIGS. 1 and 2. However, in the case of the fourth embodiment shown in FIG. 4, the respective spacing distances between adjacent pairs of digital portions 46*a* and 46*b* vary irregularly in accordance with a predetermined random code, rather than varying linearly as is the case in the embodiments shown in each of FIGS. 1 and 2.

The input electrode means in each of FIGS. 1–4, in response to an input applied thereto, produces a surface acoustic wave at each pair of digital portions having a half-wavelength equal to the spacing between the digital portions of that pair. Thus, in the case of FIG. 1, surface acoustic waves of relatively long wavelength will be produced by the relatively wide spacing at the left of the input means thereof, while surface acoustic waves of relatively short wave length will be produced by the relatively narrow spacing at the right of the input means thereof. Since the output means of FIG. 1 is a mirror image of the input means thereof, due to resonance conditions the longer wave length surface acoustic waves will have to travel all the way from the left end of the input electrode means to the right end of the output electrode means, while the shorter wavelength surface acoustic wave will have to travel only the short distance from the right end of the input electrode means to the left end of the output electrode means. In FIG. 2, the longer surface acoustic waves will have to travel a relatively short distance from input to output electrode means, while the relatively short surface acoustic waves will have to travel a relatively long distance from input to output electrode means. In the case of FIG. 3, where the output electrode means corresponds directly to the input electrode means and is not a mirror image thereof, all surface acoustic waves, both long and short, will have to travel the same distance between input and output electrode means.

The surface acoustic waves are loosely coupled to the output electrode means. Therefore, the voltages developed by the adjacent digital portions of the output electrode means will appear to be due to high impedance sources in parallel. Thus, if the output electrode means is connected to a relatively low load resistance, the current flowing into this low resistance will be proportional to the sum of the voltages developed by these sources.

The ratio of the widest to the narrowest spacing between adjacent pairs of digital portions of the input and the output means of FIGS. 1 to 4, respectively, should preferably be less than two to one in order to prevent any single pair of adjacent digital portions of the output electrode means from responding to more than one of the surface acoustic wavelengths generated by the input electrode means.

Referring now to FIG. 5, there is shown a radar system utilizing the present invention as an encoder and as a decoder. More particularly, as shown in FIG. 5, radar transmitter 50 produces a delta pulse, such as delta pulse 51. Pulse 51 is applied as an input to encoder 52, which for illustrative purposes will be assumed to consist of the electroacoustic wave shaping device of FIG. 1. When delta pulse 51 is applied to the input electrode means of the device shown in FIG. 1, a linearly frequency modulated output wave pulse 53 will be produced by the output electrode means of the device shown in FIG. 1. Frequency modulated wave pulse 53 is applied to radar antenna means 54 and is transmitted as exploratory pulse therefrom.

It is desirable to transmit as an exploratory pulse a frequency modulated wave pulse rather than a delta pulse for two reasons. First, distributing the transmitted power over a wider frequency band prevents overloading of receivers. Second, it is much more difficult to jam an exploratory pulse whose power is distributed over a wide frequency spectrum.

Any echoes of the transmitted frequency modulated wave pulse 53 are picked up by radar antenna means 54 to provide frequency modulated echo pulse output 55. Frequency modulated pulse 55 is applied as an input to decoder 56, which for illustrative purposes will be assumed to be the device shown in FIG. 2. Further, the input means of the device shown in FIG. 2 will be assumed to be identical to the output means of the device shown in FIG. 1 and the output means of the device shown in FIG. 2, which is a mirror image of the input means thereof, will be assumed to be identical to the input means of the device shown in FIG. 1. Decoder 56 will therefore produce a delta pulse output 57, which is applied as an input to radar receiver 58.

More complex frequency-modulated radio frequency pulses may be transmitted if encoder 52 is made in accordance with the device of FIG. 4, where the irregular spacing between adjacent pairs of digital portions of the input means is in accordance with a random code and the output means is a mirror image thereof. In this case, decoder 56 would consist of a device similar to FIG. 4, but having an input means which has the configuration of the output means of the device of FIG. 4 and output means which has the configuration of the input means of FIG. 4.

The device shown in FIG. 3 is particularly useful as a very wide band-pass filter having sharp upper and lower cut-offs. More particularly, the effective band width, or three db. points, of each pair of digital portions is only a few percent of the frequency to which that pair of digital portions is tuned. Therefore, by linearly changing the spacing distance between each successive pair of digital portions by this percentage and utilizing a large number of digital portions, a very wide overall band width may be passed, but any wave length which is shorter than that which is accommodated by the narrowest spacing distance or is longer than that which is accommodated by the widest spacing distance will be rejected.

Although only certain preferred embodiments of the present invention have been described herein, it is not intended that the invention be restricted hereto, but that it be limited by the true spirit and scope of the appended claims.

What is claimed is:

1. A device comprising a piezoelectric substrate having a surface for supporting acoustic surface waves traveling on said surface in response to an electrical input being applied to electrode means on said substrate surface, said electrode means including respective first and second electrodes each having a plurality of digital portions, said digital portions of said first and second electrodes being arranged substantially parallel to each other in spaced interdigital relationship with the spacing distances between each successive adjacent pair of interdigitized digital portions thereof being preselected in accordance with an arbitrary code wherein the respective distances between at least two adjacent pairs of interdigital portions is significantly unequal.

2. The device defined in claim 1, wherein the spacing distance between successive adjacent pairs of interdigitized digital portions varies linearly.

3. The device defined in claim 1, wherein said arbitrary code is random.

4. The device defined in claim 1, further comprising second electrode means on said substrate surface for producing an electrical output in response to said acoustic surface waves impinging thereon, said second electrode means including respective third and fourth electrodes each having a plurality of digital portions arranged substantially parallel to each other and to the digital portions of said first and second electrodes, said third and fourth electrodes being displaced a given distance from said first and second electrodes in a direction substantially perpendicular to said parallel digital portions, and said digital portions of said third and fourth electrodes being in spaced interdigital relationship with the spacing distance between each successive adjacent pair of interdigitized digital portions thereof being preselected in accordance with said arbitrary code.

5. The device defined in claim 4, wherein said respective spacing distances of said digital portions of said third and fourth electrodes corresponds in the same order and is equal to corresponding ones of said respective spacing distances of said digital portions of said first and second electrodes, whereby said second electrode means is effectively an identical replica of said first electrode means which is displaced therefrom along said surface.

6. The device defined in claim 4, wherein said respective distances of said digital portions of said third and fourth electrodes corresponds in reverse order and is equal to corresponding ones of said respective spacing distances of said digital portions of said first and second electrodes, whereby said second electrode means is effectively a mirror image of said first electrode means which is displaced therefrom along said surface.

7. In a radar system comprising a transmitter, a receiver and antenna means, the combination therewith of encoder means coupled between said transmitter and antenna means for converting a short narrow-band delta pulse applied as an input thereto from said transmitter to a longer wide-band output pulse which is frequency modulated in accordance with a predetermined arbitrary code for transmission of said output pulse as an exploratory pulse from said antenna means, and decoder means coupled between said antenna means and said receiver for converting an echo pulse of said exploratory pulse, which echo pulse is applied as an input thereto, back into a short narrow-band delta pulse for application of said converted-back delta pulse to said receiver, wherein said encoder means comprises a pair of electrode means disposed on a surface of a piezoelectric substrate, each of said pair of electrode means including respective first and second electrodes each having a plurality of digital portions, said digital portions of said first and second electrodes of one of said pair of electrode means being arranged substantially parallel to each other in spaced interdigital relationship, said digital portions of said first and second electrodes of the other of said pair of electrode means being arranged substantially parallel to each other and to said digital portions of said one of said pair of electrode means, said first and second electrodes of said other of said pair of electrode means being displaced a given distance from said first and second electrodes of said one of said pair of electrode means in a direction substantially perpendicular to said parallel digital portions, said digital portions of said other of said pair of electrode means being in spaced interdigital relationship with the spacing distance between each successive adjacent pair of interdigitized digital portions thereof corresponding in reverse order and being equal to the corresponding one of said respective spacing distances of said digital portions of said one of said pair of electrode means, and the spacing distance between successive adjacent pairs of interdigitized digital portions of said one of said pair of electrode means being preselected in accordance with an arbitrary code, and wherein said one of said pair of electrode means is coupled to said transmitter and the other of said pair of electrode means is coupled to said antenna means.

8. The radar system defined in claim 7, wherein said decoder means comprises a second pair of electrode means disposed on a surface of a piezoelectric substrate, one of said second pair of electrode means being a replica of said one of said first-mentioned pair of electrode means and the other of said second pair of electrode means being a replica of said other of said first-mentioned pair of electrode means, and wherein said one of said second pair of electrode means is coupled to said antenna means and said other of said second pair of electrode means is coupled to said receiver.

References Cited

UNITED STATES PATENTS

| | | | |
|---|---|---|---|
| 2,540,194 | 2/1951 | Ellett | 340—10 X |
| 3,104,377 | 9/1963 | Alexander et al. | 310—9.7 X |
| 3,216,013 | 11/1965 | Thor | 343—17.2 |
| 3,299,427 | 1/1967 | Kondo | 343—17.2 X |

RODNEY D. BENNETT, *Primary Examiner.*

J. P. MORRIS, *Assistant Examiner.*